Feb. 6, 1934.   W. E. HARDEMAN ET AL   1,946,209
TRACTION TREAD
Filed July 8, 1933
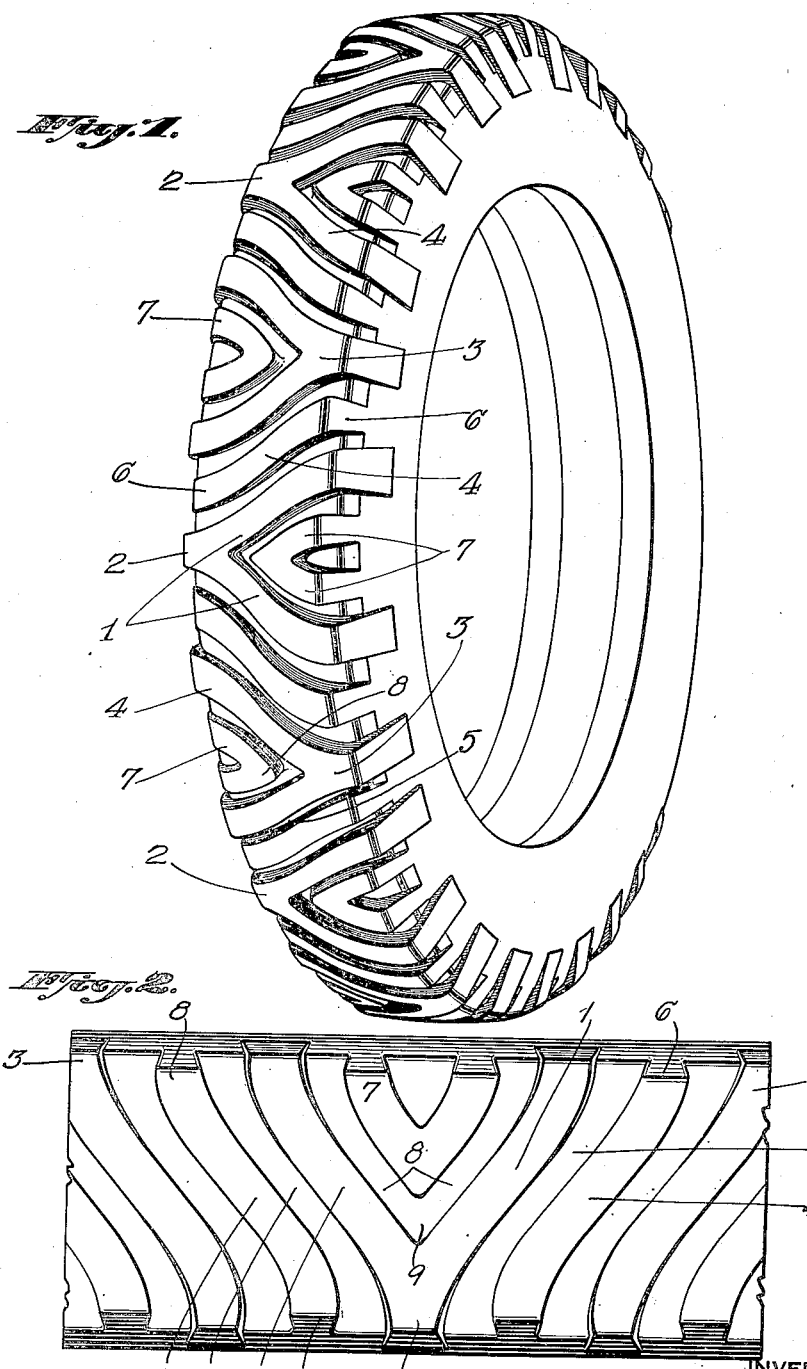
INVENTOR
WILLIAM EDWARD HARDEMAN.
ERIC SIDNEY TOMPKINS.
BY
ATTORNEY Patented Feb. 6, 1934

1,946,209

UNITED STATES PATENT OFFICE 1,946,209

TRACTION TREAD

William Edward Hardeman, Acocks Green, Birmingham, and Eric Sidney Tompkins, Stratford on Avon, England, assignors to Dunlop Tire & Rubber Corporation, Buffalo, N. Y., a corporation of New York Application July 8, 1933, Serial No. 679,518, and in Great Britain July 6, 1932

11 Claims. (Cl. 152—14)

This invention concerns improvements in or relating to traction treads for rubber tires and more particularly concerns improvements in such treads for pneumatic tires for use on vehicles traversing comparatively unmade country of a sandy or muddy nature, or roads and other areas covered by snow.

It has already been proposed to provide rubber tires with substantial upstanding ribs of comparatively deep and square section arranged obliquely across the tread with even spacing between the ribs and more recently it has been proposed to impart to such tread ribs a more highly sinuous curvature.

Where the ribs are obliquely parallel however, it necessarily follows that a certain additional side thrust is imparted to the wheel so fitted, the thrust so engendered being neutralized by fitting to the opposite wheel a tire having ribs disposed with an equal but opposite inclination.

In consequence free interchange or replacement of such tires between the wheels when worn is not readily effected if the neutralization of the side thrust is to be maintained.

One of the objects of our invention is to combine both such treads in a single tread formation such that each tire is freely interchangeable and replaceable, without increasing the side thrust in either direction.

Another object of the invention is to impart to such a tread, a configuration adapted to promote a self-clearing action when the vehicle traverses sandy, broken, or muddy ground.

Another object of the invention is to ensure that the traction edges over that portion of the tire which is momentarily in contact with the ground are obliquely inclined at a relatively great angle to the path of the vehicle, each rib exerting a tractive effort over a relatively deep zone of greater length than width in the path of the vehicle and minimizing loss of grip due to passage over transverse ruts or ridges.

According to this invention we provide a tire tread having dual ribs intersecting in angular relation to one another, extending obliquely across the tread and defining zones between the ribs having openings some on one side of the tread and some on the other, the tread being further characterized in that the openings occur alternatively on each side of the tread, the intersecting ribs being spaced by oblique transverse ribs, and the space between the ribs being less adjacent the central plane and increasing towards each side of the tread.

The various features of the invention are illustrated in the accompanying drawing in which:—

Fig. 1 is a perspective view of a pneumatic tire having the treads described.

Fig. 2 is a part plan view of the tread to an enlarged scale.

In our invention as shown by way of example in the accompanying drawing, a pneumatic or solid rubber, or rubberized fabric tire is provided with alternate sinuous ribs 1 having rectangular edged tread portions of substantially uniform width extending sinuously i. e. with a reversal of curvature across the tread from side to side without interruption.

The intersection of each pair of ribs is arranged to take place adjacent the sides of the tread and on each side alternately at a series of points 2 and 3, the rounded edged buttresses at the closed and open sides fading substantially into the tire wall.

Between the inner ribs of each pair of intersecting ribs 2 is molded a sinuous spacing rib 4, the obliquity of which in relation to the larger cup forming ribs on either side is such that the space or groove 5 between the interposed rib and its flanking ribs 2 increases from the centre towards the sides of the tire.

These interposed ribs are slightly shorter than the intersecting ribs 2 and the buttresses or shoulders from their outer edges merge in similar manner into the tire walls but with a slightly greater slope at 6.

Within the ribs 1 which extend wholly across the tread to form the larger cup-shaped traction areas are molded minor cup forming traction projections 7 having curved surfaces, each minor cup formed on the same side as the larger one within which it is placed in relative symmetrical relation.

Here again the apices of the inner dual cup-shaped tread projections are so spaced from the outer or major projections as to provide intervening grooves or spaces 8 having a self clearing action due to a gradual diminution of the gap 8 towards the closed ends 9 and an increase in the débris exit paths towards the open ends.

What we claim is—

1. A pneumatic tire having a tread comprising spaced long and short tread ribs in circumferentially successive pairs extending obliquely crosswise of the tread, said ribs being of substantial width throughout their extent, the ribs of one pair being reversely inclined to those of a next adjacent pair, the short ribs of said pairs intersecting centrally of said tread and the longer ribs intersecting near the opposite edges of said tread to constitute a circumferential series of large traction cups containing smaller traction cups having openings to opposite sides of the tread.

2. A tire according to claim 1 characterized in that the openings occur alternately on opposite sides of the tread.

3. A tire according to claim 1 and having oblique transverse ribs spaced between intersecting ribs.

4. A tire according to claim 1 and having oblique transverse ribs spaced between intersecting ribs in which the space between the ribs and said interspaced ribs is less adjacent the central plane of the tire and increases towards each side of the tread.

5. A tire according to claim 1 in which the ribs are substantially of uniform cross section.

6. A tire according to claim 1 in which the ribs have angular edges.

7. A tire according to claim 1 in which the ribs are arranged successively in V-formation.

8. A tire according to claim 1 in which the ribs are arranged in double V-formation.

9. A tire according to claim 1 in which the ends of said ribs at the sides of the tread form buttresses merging into the tire wall.

10. A pneumatic tire having a tread comprising groups of tread ribs arranged in circumferential series, the ribs of each group being of substantial width throughout extending across the entire width of said tread to form uninterrupted grooves therebetween open to the side of the tread and being obliquely inclined to the center line of said tread at an angle reverse to that of the next adjacent groups.

11. A pneumatic tire having a tread comprising groups of tread ribs arranged in circumferential series, the ribs of each group being of substantial width throughout extending across the entire width of said tread to form uninterrupted grooves therebetween open to the side of the tread and being obliquely inclined to the center line of said tread at an angle reverse to that of the next adjacent groups and shorter ribs between each end rib of each group and the adjacent ribs of the next adjacent group.

WILLIAM EDWARD HARDEMAN.
ERIC SIDNEY TOMPKINS.